Patented Jan. 1, 1952

2,580,943

UNITED STATES PATENT OFFICE 2,580,943

PICKLING

Yoshiko Murata, Honolulu, Territory of Hawaii

No Drawing. Application October 14, 1950,
Serial No. 190,242

13 Claims. (Cl. 99—156)

This invention relates to pickling and has for an object the provision of a process for pickling daikon, the oriental radish.

The daikon pickle is a food item that is highly prized by oriental peoples. In the old prior art process of preparing daikon pickles, the whole washed daikon is allowed to stand in a mixture known as "miso" for a period of several weeks to several months. Miso is essentially a mold fermented mixture of cooked rice and soy beans. The resulting pickle, however, has an odor which is undesirable and also the pickle often causes a disagreeable odor to the breath of the individual eating it.

An object of this invention is the provision of a process of pickling in which the consistency, flavor and odor of the resulting pickles are substantially improved.

A further object of this invention is the provision of a process for pickling daikon whereby a product is obtained having improved flavor and odor characteristics.

A still further object of this invention is the provision of a daikon pickle from which the usual odor imparting substances have been removed.

Further and additional objects will appear from the following description and the appended claims.

In accordance with one embodiment of this invention it has been discovered that the disagreeable odor and odor imparting qualities of daikon pickle can be overcome by treating the daikon, prior to pickling, with a semi-solid residue obtained from the acid hydrolysis of a vegetable protein. In accordance with a preferred embodiment of the invention, fresh daikon is superficially dried whole or in the uncomminuted state and then allowed to stand for a period of several days or weeks in a semi-solid residue obtained from the strong acid hydrolysis of a vegetable protein. Thereafter the daikon is removed from the residue, washed, and then immersed in miso for an extended period of time to produce the desired pickle. The resulting daikon pickle has a unique flavor imparted by the hydrolysate residue and has a superior odor and consistency. The daikon when pickled by this process imparts no displeasing odor to the breath.

For a more complete understanding of this invention reference will be made to a specific embodiment thereof. However, it will be apparent that certain modifications may be made as will be readily apparent to one skilled in the art, without departing from the spirit and scope of this invention.

A quantity of fresh daikon in the uncomminuted state, that is either whole or sliced, is superficially dried in sunlight or artificially for a period of four to five hours. The resulting daikon is then immersed in a semi-solid residue obtained from the strong acid hydrolysis of a vegetable protein such as wheat gluten and soy bean protein. Suitably about one pound of daikon is added to about 10 pounds of the wet residue. The daikon is allowed to remain immersed in the residue for more than about one and one-half weeks, suitably one and one-half to two and one-half weeks, whereafter the daikon is removed and washed with water. Excess water may be removed from the daikon by squeezing with suitable weights or other suitable means.

The residue from the acid hydrolysis of the vegetable protein may then be reused for treating an additional batch of daikon, if desired. Preferably this residue is one which may be obtained as a by-product in accordance with the disclosure in Hideko Murata Patent No. 2,444,577, dated July 6, 1948. That patent discloses a process for the production of shoyu, a Japanese type soy sauce, in which a mixture of soy bean protein and another vegetable protein, such as wheat gluten, is completely hydrolyzed in aqueous solution with a strong mineral acid, such as hydrochloric acid, at elevated temperatures. There is a solid residue which results from this process and it is this residue which finds use in the pickling of daikon in accordance with this invention. While a mixture of wheat gluten and soy bean protein residues is preferred, it is also within the scope of this invention to employ residues obtained from soy bean protein alone or wheat gluten alone. A mixture of soy bean protein and corn zein residues is satisfactory as is a corn zein residue alone. In addition, residues from the vegetable proteins of oats, barley, rye or peanuts, singly or in combination, may be used, if desired.

In accordance with a preferred embodiment of the invention a suitable residue is prepared by boiling 7½ pounds of wheat gluten and 3 pounds of soy beans with 3 pounds of 20° Baumé hydrochloric acid under reflux conditions until the hydrolysis is complete. Thereafter the mixture is neutralized to about pH 5.5 with caustic soda and filtered. The liquid filtrate is the basis for a soy sauce all as disclosed in the above referred to Murata patent. The semi-solid residue remaining which may require the addition of some water for ease of handling is the material employed for treating daikon in accordance with this invention.

After the daikon has been separated from the hydrolysate residue and the excess water has been removed, as indicated above, it is then subjected to the traditional pickling in miso. Miso may be prepared by inoculating about 100 pounds of steamed rice with *Aspergillus oryzae* and then adding about 80 pounds of mashed cooked soy beans, 40 pounds of salt, 10 pounds of sugar and 2½ pounds of liquid obtained from cooking the soy beans. This mixture is allowed to stand and ferment in a barrel for about three weeks to produce the desired miso for the pickling operation.

The daikon is submerged in the miso as the pickling agent in the proportions of about one pound of daikon to about 8 pounds of miso, and the resulting mixture is allowed to stand for a period in excess of about thirty days, suitably between thirty and forty-five days. Thereafter a portion of the miso may be removed and employed for pickling additional batches of hydrolysate residue-treated daikon, and the daikon and remaining miso may be suitably packaged for sale in barrels, cans or jars without further pasteurization or sterilization.

The resulting daikon pickled by the above indicated process has an improved and unique flavor which is imparted by the preliminary residue treating step. It has a superior odor and consistency and does not impart any displeasing odor to the breath.

As suggested above, vegetable proteins other than a mixture of soy bean protein and wheat gluten may be employed for preparing the hydrolysate residue. Also strong acids other than hydrochloric acid may be employed for effecting the acid hydrolysis in the preparation of the residue as is well understood in the art. While the invention has particular usefulness in preparing daikon pickles, it also finds utility in preparing other pickles where undesired odor characteristics are to be eliminated or wherein the flavor is to be improved.

While a particular embodiment of this invention is shown above, it will be understood, of course, that the invention is not to be limited thereto, since many modifications may be made, and it is contemplated, therefore, by the appended claims, to cover any such modifications as fall within the true spirit and scope of this invention.

I claim:

1. A process of treating daikon which comprises immersing pieces of uncomminuted daikon in the wet state in a solid residue from the acid hydrolysis of a vegetable protein, separating said residue from said daikon after an extended period of contact, and thereafter pickling said daikon.

2. The process recited in claim 1 wherein said vegetable protein includes wheat gluten.

3. The process recited in claim 1 wherein said vegetable protein includes corn zein.

4. The process recited in claim 1 wherein said vegetable protein includes soy bean protein.

5. A process of treating daikon which comprises immersing pieces of uncomminuted daikon in the wet state in a solid residue from the acid hydrolysis of a vegetable protein, separating said residue from said daikon after an extended period of contact, and thereafter pickling said daikon in miso for an extended period.

6. The process recited in claim 5 wherein said miso comprises a mold fermented mixture of soy bean and rice.

7. The process recited in claim 6 wherein said period is about 1½ to 2½ weeks at room temperature and wherein said pickling is effected at room temperature for a period in excess of about 30 days.

8. The process recited in claim 6 wherein the fermented mixture is an *Aspergillus oryzae* ferment.

9. The process recited in claim 5 wherein said acid is hydrochloric acid.

10. A process of treating daikon which comprises superficially drying whole daikon, immersing said daikon in a wet solid residue obtained from the acid hydrolysis of a mixture of soy bean protein and another vegetable protein for a period in excess of about 1½ weeks, separating said residue and washing said daikon, and thereafter immersing said daikon in an *Aspergillus oryzae* ferment of cooked rice and soy bean for a period in excess of about 30 days.

11. The process recited in claim 5 wherein said vegetable protein includes wheat gluten.

12. The process recited in claim 5 wherein said vegetable protein includes corn zein.

13. The process recited in claim 5 wherein said vegetable protein includes soy bean protein.

YOSHIKO MURATA.

REFERENCES CITED

The following references are of record in the file of this patent:

UNITED STATES PATENTS

| Number | Name | Date |
|---|---|---|
| 2,444,577 | Murata | July 6, 1948 |